(12) United States Patent
Oki et al.

(10) Patent No.: US 7,990,367 B2
(45) Date of Patent: Aug. 2, 2011

(54) ON-VEHICLE MANIPULATING SYSTEM

(75) Inventors: Tetsuya Oki, Kariya (JP); Norio Yamamoto, Kariya (JP); Nozomi Kitagawa, Okazaki (JP); Takeshi Haruyama, Kariya (JP); Yuuji Matsumoto, Chiryu (JP)

(73) Assignee: Denso Corporation, Kariya (JP)

( * ) Notice: Subject to any disclaimer, the term of this patent is extended or adjusted under 35 U.S.C. 154(b) by 1104 days.

(21) Appl. No.: 11/802,611

(22) Filed: May 24, 2007

(65) Prior Publication Data

US 2007/0273657 A1 Nov. 29, 2007

(30) Foreign Application Priority Data

May 29, 2006 (JP) ................................. 2006-148532

(51) Int. Cl.
*H01H 13/70* (2006.01)

(52) U.S. Cl. ........................................ 345/172; 200/5 A

(58) Field of Classification Search .................. 200/345; 345/172

See application file for complete search history.

(56) References Cited

U.S. PATENT DOCUMENTS

| | | | | |
|---|---|---|---|---|
| 6,476,794 B1 * | 11/2002 | Kataoka et al. | ............... | 345/161 |
| 6,563,492 B1 * | 5/2003 | Furuya | ............................ | 345/178 |
| 6,636,200 B2 * | 10/2003 | Kataoka et al. | ............... | 345/161 |

FOREIGN PATENT DOCUMENTS

| | | |
|---|---|---|
| JP | A-7-306055 | 11/1995 |
| JP | A-7-319620 | 12/1995 |
| JP | A-7-319629 | 12/1995 |
| JP | A-9-222949 | 8/1997 |
| JP | A-2002-133401 | 5/2002 |
| JP | A-2004-026078 | 1/2004 |
| JP | A-2005-156257 | 6/2005 |
| JP | A-2005-199973 | 7/2005 |

\* cited by examiner

*Primary Examiner* — Renee Leubke
*Assistant Examiner* — Lheiren Mae A Caroc
(74) *Attorney, Agent, or Firm* — Posz Law Group, PLC

(57) ABSTRACT

An on-vehicle manipulating system includes a manipulating device having a housing, a first side pushbutton switch disposed at one side of the housing, a second side pushbutton switch disposed at the other side of the housing and an additional switch disposed at a prescribed portion of the housing and a control unit for setting a first function to one of the first and second pushbutton switches and a second function to the other pushbutton switch. In this manipulating system, the control unit changes the function of the first or second side pushbutton switch from the first function such as an ENTER key to the second function, such as a RETURN key, and the function of the other pushbutton switch, such as a MENU key, from the second function to the first function when one of the pushbutton switches being set to change the function is operated subsequent to the other pushbutton switch that has been set the second function is operated in a prescribed period after the additional switch is operated.

12 Claims, 10 Drawing Sheets

ON-VEHICLE MANIPULATING SYSTEM

CROSS REFERENCE TO RELATED APPLICATION

The present application is based on and claims priority from Japanese Patent Application 2006-148532, filed May 29, 2006, the contents of which are incorporated herein by reference.

BACKGROUND OF THE INVENTION

1. Field of the Invention

The present invention relates to an on-vehicle manipulating system that includes a manipulating device having a pair of pushbutton switches and a control unit for setting a function to one of the pushbutton switches and another function to the other pushbutton switch.

2. Description of the Related Art

Various on-vehicle manipulating systems are disclosed in JP-7-319629-A, JP-7-306055-A, JP-2002-133401-A, JP-2005-199973-A, and JP-2005-156257-A. In such a system, a manipulating device is disposed between the driver's seat and the passenger's seat of a vehicle to be manipulated by a driver or a passenger.

In the manipulating system disclosed in JP-A-7-319629, another switch and additional works are necessary to change the function of the pair of pushbutton switches. In the manipulating systems disclosed in JP-A-7-306055 and JP-A-2002-133401, it is difficult to integrate the manipulating device into a unit because an infrared ray device and a CMOS sensor are necessary. In the manipulating system disclosed in JP-A-2005-199973, it is necessary to detect a hand of a user (a driver or a passenger) by a complicated arrangement. In the manipulating system disclosed in JP-2005-156257-A, a user must use a pair of dial switches.

SUMMARY OF THE INVENTION

Therefore, an object of the invention is to provide a simple manipulating system in which a manipulating device having pushbutton type switches whose function can be changed by a simple action.

According to an aspect of the invention, an on-vehicle manipulating system includes a manipulating device having a housing, a first side pushbutton switch disposed at one side of the housing, a second side pushbutton switch disposed at the other side of the housing and an additional switch disposed at a prescribed portion of the housing, and a control unit for setting a first function to one of the first and second pushbutton switches and a second function to the other pushbutton switch. In this manipulating system, the control unit changes the function of one of the first and second side pushbutton switches from the first function to the second function and the function of the other pushbutton switch from the second function to the first function when one of the pushbutton switches being set to change the function is operated subsequent to the other pushbutton switch that has been set the second function is operated in a prescribed period after the additional switch (5b) is operated.

Therefore, two functions that are much frequently used can be set to pushbutton switches of a manipulating device that are very easy for a user to operate.

According to another aspect of the invention, an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch.

In this manipulating system, the control unit changes the function of one of the first and second side pushbutton switches from the second function to the first function and the function of the other pushbutton switch from the first function to the second function when one of the pushbutton switches being set to change the function is operated subsequent to the other pushbutton switch that has been set the second function is operated after none of the first and second side pushbutton switches has been operated for a prescribed period.

According to another aspect of the invention, an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch. In this manipulating system, the control unit sets the first function to one of the first and second side pushbutton switches if the one of pushbutton switches is double-clicked or operated for a long time and sets the second function to the function of the other pushbutton switch.

According to another aspect of the invention, an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch; and a display device for displaying a displayed pushbutton.

In this manipulating system, the control unit sets the first function to one of the first and second side pushbutton switches and sets the second function to the other of the first and second side pushbutton switches according operation of the displayed pushbutton by the one of the first and second side pushbutton switches. The control unit may set the first function to one of the first and second side pushbutton switches if the display pushbutton is operated by the one of the first and second side pushbutton switch and sets the second function to the other of the first and second side pushbutton switches. Further, the displayed device may display a first displayed pushbutton to be operated by the first side pushbutton switch and a second displayed push button to be operated by the second side pushbutton switch, the control unit may set the first function the first side pushbutton switch and the second function to the second side pushbutton switches when the first displayed pushbutton is operated by one of the first side and second side pushbutton switches, and the control unit may sets the first function to the second side pushbutton switch and the second function to the first side pushbutton switches when the second displayed pushbutton is operated by one of the first side and second side pushbutton switches.

According to another aspect of the invention, an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch and a display device for displaying a display pushbutton.

In this manipulating system, the control unit changes the function of one of the first and second side pushbutton switches from the second function to the first function and the function of the other pushbutton switch from the first function to the second function when the display pushbutton is operated by one of the pushbutton switches.

According to another aspect of the invention, an on-vehicle manipulating system includes a manipulating device having a housing, a first side pushbutton switch, a finger-insert-able first hole, which are disposed at one side of the housing, a second side pushbutton switch and a finger-insert-able second hole, which are disposed at the other side of the housing, and a control unit for setting a first function to one of the first and second pushbutton switches and a second function to the other pushbutton switch. In this manipulating system, the control unit sets the first function to the first side pushbutton switches and the second function to the second side pushbutton switch when a finger is inserted into the first side hole and sets the first function to the second side pushbutton switches and the second function to the first side pushbutton switch when a finger is inserted into the second side hole.

According to another aspect of the invention an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch and means for sensing an operation of a vehicle accessory.

In the above manipulating system, the control unit sets the first function to one of the first and second side pushbutton switches and the second function to the other pushbutton switch according to the output signal of the means for sensing an operation of vehicle accessory.

According to an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch and means for sensing engine operation of the vehicle. In the above manufacturing system, the control unit sets the first function to one of the first and second side pushbutton switches and the second function to the other pushbutton switch according to the output signal of the means for sensing engine operation.

According to another aspect of the invention, an on-vehicle manipulating system includes a manipulating device having a housing, a first side pushbutton switch disposed at one side of the housing and a second side pushbutton switch disposed at the other side of the housing, a control unit for setting a first function to one of the first and second pushbutton switches and a second function to the other pushbutton switch and means for sensing touch by a user with the manipulating device.

In the above manipulating system, the control unit sets the first function to one of the first and second side pushbutton switches and the second function to the other pushbutton switch according to the output signal of the means for sensing touch by a user.

In any of the above manipulating systems, the control unit may provides a driver's mode in which the first side pushbutton switch is set to the first function key and the second side pushbutton switch is set to the second function key and a passenger's mode in which the second side pushbutton switch is set to the first function key and the first side pushbutton switch is set to the second (RETURN) function key. The control unit may change the passenger's mode to the driver's mode when a predetermined time has passed after none of the first and second side pushbutton switches is operated.

In addition, means for displaying a cursor by the display device may be provided. In this case, the means for displaying indicates one of the driver's mode and the passenger's mode that is provided by the control unit by the cursor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An on-vehicle manipulating system 1 according to a preferred embodiment of the present invention will be described with reference to the appended drawings.

Figure 1:
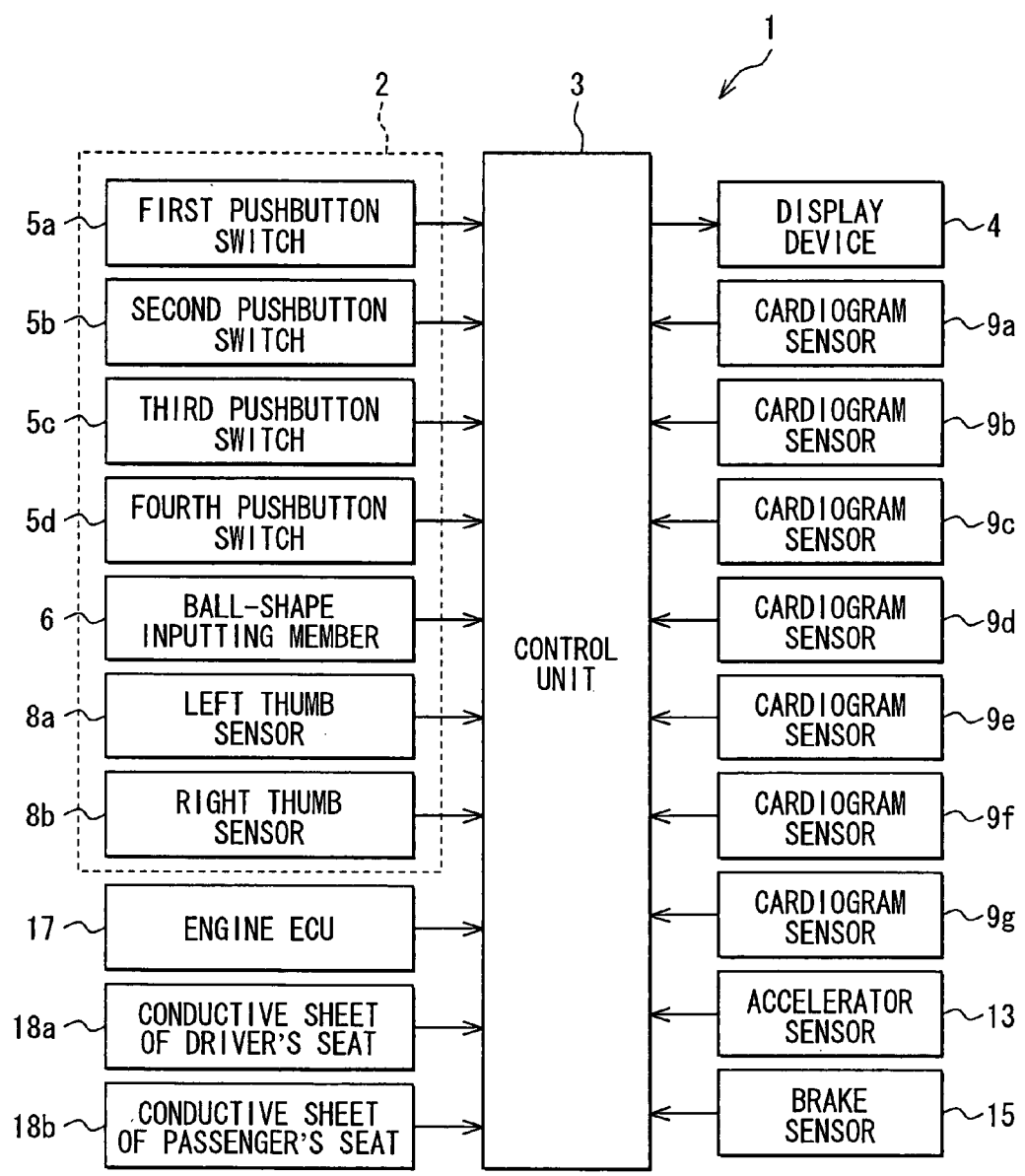
FIG. 1 is a block diagram of an on-vehicle manipulating system according to a preferred embodiment of the invention.
Figure 2A:
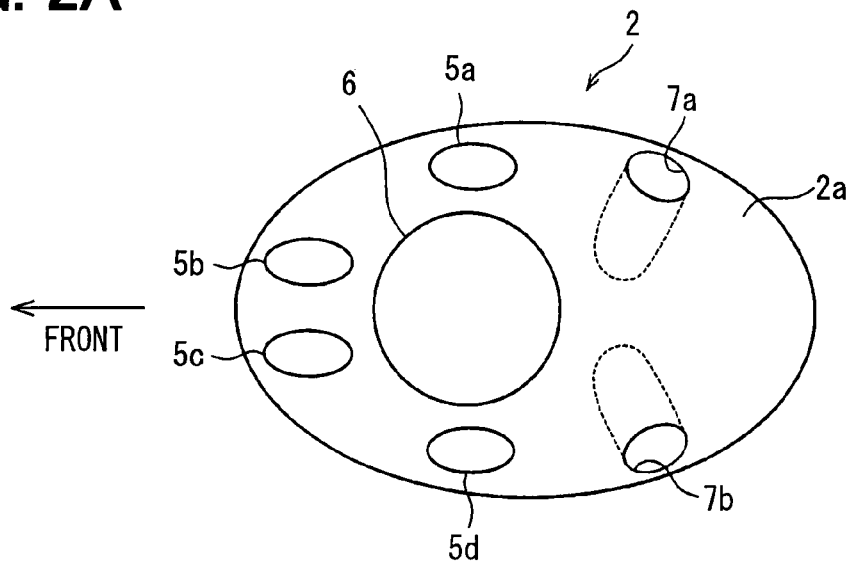
FIGS. 2A, 2B and 2C illustrate a manipulating device of the manipulating system according to a preferred embodiment of the invention.
Figure 2B:
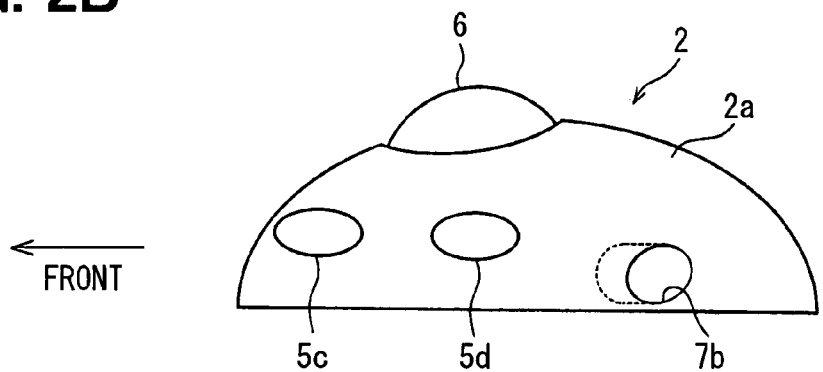
Figure 2C:
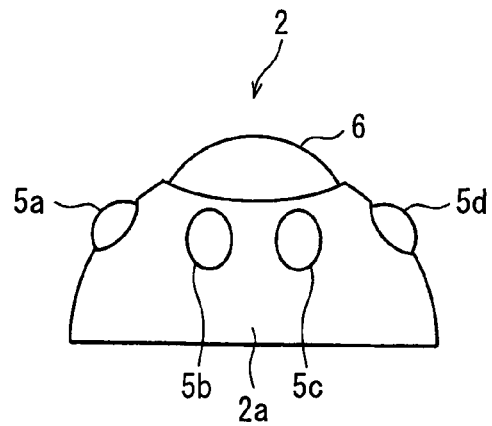

As shown in FIG. 1, the on-vehicle manipulating system includes a manipulating device 2, a control unit 3, a display device 4, etc.

The manipulating device 2 is placed at the center console of a vehicle between the driver's seat of the vehicle and the passenger's seat thereof. The manipulating device 2 includes a housing 2a of an oval shape, a first pushbutton switch 5a, a second pushbutton switch 5b, a third pushbutton switch 5c, a fourth pushbutton switch 5d and a ball-shape inputting member 6. The housing 2a has a first (left) hole 7a and a second (right) hole 7b. The manipulating device 2 also includes a touch sensor made of a conductive sheet to detect a touch by the user with the housing 2a.

In case that the steering wheel is placed at the right side of the vehicle (i.e. the right steering wheel vehicle), the manipulating device 2 is located at the left side of the driver's sheet so that the driver can hold the whole body of the manipulating device 2 by the left hand.

Accordingly the drive can operate the first pushbutton switch 5a with his left hand thumb, the second pushbutton switch 5b with his left hand forefinger, the third pushbutton 5c with his left hand middle finger and the fourth pushbutton 5d with his left hand ring finger or little finger. It is also possible for the driver to insert his left hand thumb into the first hole 7a.

On the other hand, a person or a passenger on the passenger seat can operate the fourth pushbutton switch 5d with his right hand thumb, the third pushbutton switch 5c with his right hand forefinger, the second pushbutton switch 5b with his right hand middle finger and the first pushbutton 5a with his right hand ring finger or little finger. It is also possible for the passenger to insert his right hand thumb into the fourth hole 7b.

When one of the pushbutton switches 5a-5d and the ball-shaped inputting member is operated, the control unit 3 receives a signal and operates the display device 4 in a prescribed manner.

A finger sensor 8a is installed in the first hole 7a to send a signal to the control unit 3 when the driver inserts the left hand thumb into the first hole 7a. A finger sensor 8b is also installed in the second hole 7b to send a signal to the control unit 3 when the passenger inserts the right hand thumb into the second hole 7b.

Figure 3:
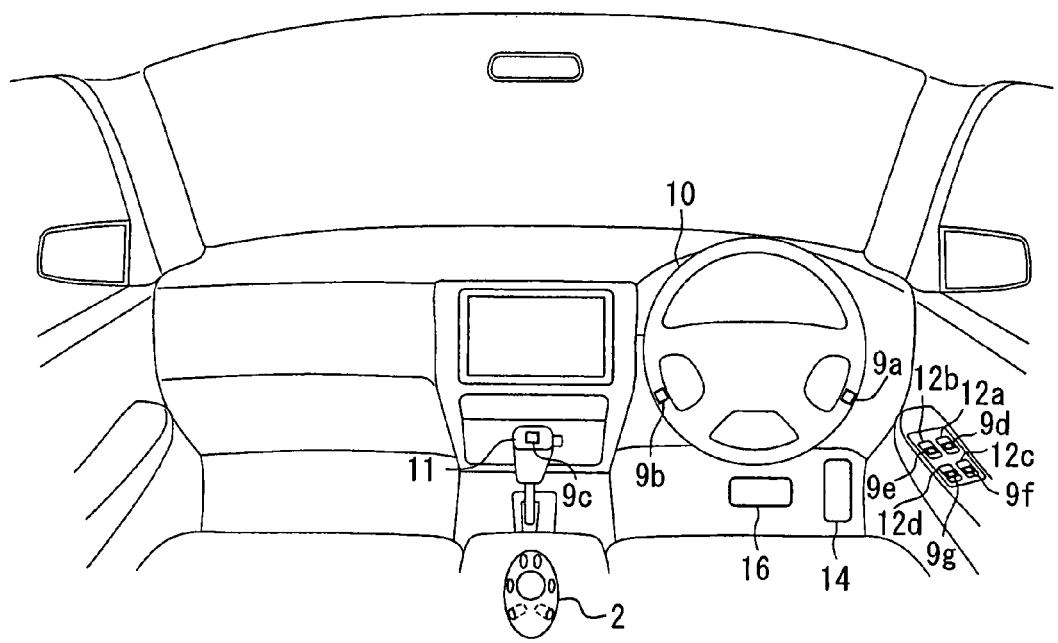
FIG. 3 illustrates a front side of a vehicle passenger compartment.

As shown in FIG. 3, a plurality of electrocardiogram sensors 9a-9g is distributed in various portions, such as a steering wheel 10, a shift lever knob 11 and window-operating switches 12a-12d. If the driver operates one of them, one of the electrocardiogram sensors 9a-9g detects the electrocardiogram and sends a signal to the control unit 3.

An accelerator sensor 13 and a brake sensor 15 are also installed in the vehicle to detect the operation of the accelerator 14. When the driver operates the accelerator pedal 14 or the brake pedal 16, the accelerator sensor 14 or the brake sensor 15 sends a signal to the control unit 3.

An engine ECU 17 is also connected with the control unit 3. The engine ECU 17 sends the control unit 3 a signal of engine operation. A driver's seat conductive sheet 18a is mounted on the driver's seat and connected with the control unit 3 to form a close circuit with the conductive sheet of the touch sensor that is mounted on the manipulating device 2, thereby providing the control unit 3 with a signal when the driver sitting on the driver's seat touches the manipulating device 2. A passenger's seat conductive sheet 18b is also mounted on the passenger's seat and is connected with the control unit 3 to form a close circuit with the conductive sheet of the touch sensor that is mounted on the manipulating device 2, thereby providing the control unit 3 with a signal when the passenger on the passenger's seat touches the manipulating device 2.

With the above arrangement, the control unit 3 can set the function of an "ENTER" key to one of the first pushbutton switch 5a and the fourth pushbutton switch 5d and the function of a "RETURN" key to the fourth pushbutton switch 5d. If the above arrangement is used in a navigation system for example, the function of the ENTER key is to choose "SELECT DESTINATION", "ENTER DESTINATION", "SELECT ROOT", "START GUIDANCE", and the function of the RETURN key is to redo or to return to a higher level of the application. Therefore, the ENTER key is used much more frequently than the RETURN key.

Operation of the control unit 3 will be described next. The control unit 3 has the following ten functions.

Figure 4:
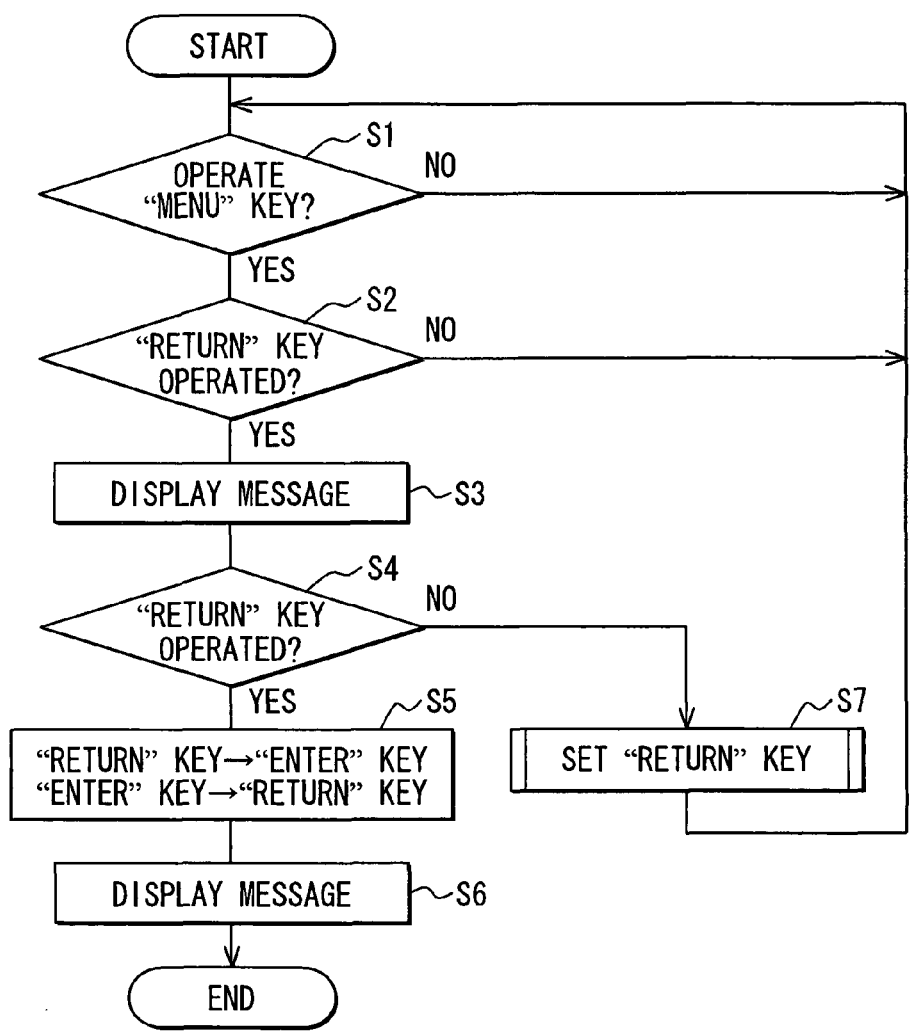
FIG. 4 is a flow diagram of operation of the manipulating system.

(1) If one of the first pushbutton switch 5a and the fourth pushbutton switch 5d is operated after operating a "MENU" key, the control unit 3 operates according to a flow diagram shown in FIG. 4. Incidentally, the function of the MENU key is set to the second pushbutton switch 5b.

When the second pushbutton switch 5b that is used as the MENU key, is operated, the control unit detects the operation and provides YES at step S1. Then, whether the RETURN key, which is set to one of the first pushbutton switch 5a and the fourth pushbutton switch 5d, is operated or not is examined at S2, in which YES is provided if the RETURN key is operated.

Figure 5A:
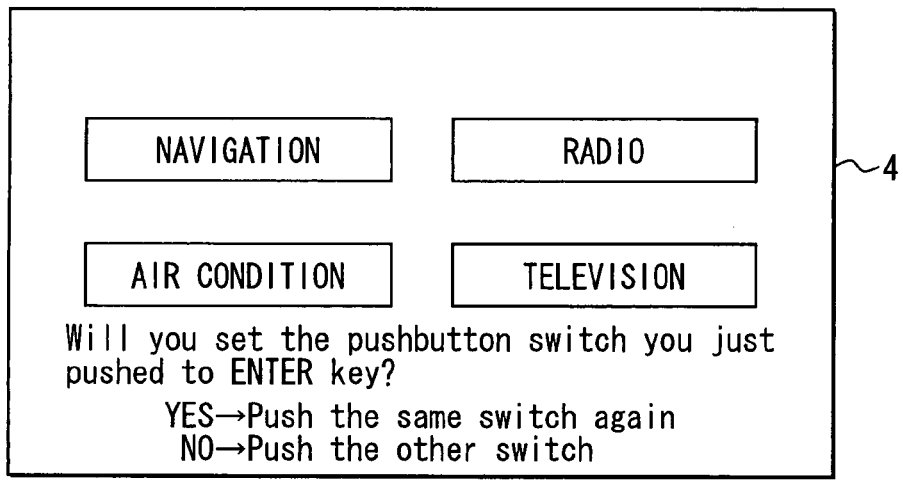
FIGS. 5A and 5B illustrate displays of guidance.
Figure 5B:
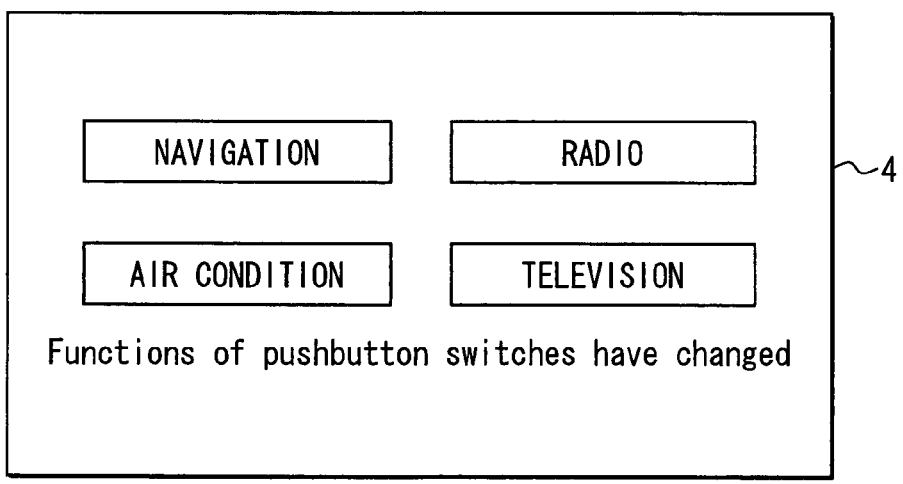

For example, a message "Will you set the pushbutton switch you just pushed to ENTER key ?" is displayed on the display device 4, as shown in FIG. 5A, at step S3. Thereafter, the control unit 3 waits until the RETURN key (the pushbutton switch 5a or 5d) is operated again in a predetermined period at step S4, where YES is provided if the pushbutton switch as the RETURN key is pushed again in the predetermined period. Subsequently, the control unit 3 changes the pushbutton switch that has been operated as the RETURN key to the ENTER key and the other push button switch that has been operated as the ENTER key to the RETURN key at step S5. Thereafter, the control unit 3 displays a message "Functions of pushbutton switches have changed" on a display panel of the display device 4 at step S6, as shown in Fig. B and ends its operation.

If the control unit 3 does not receive a signal of the operation of the pushbutton switch as the RETURN key in the predetermined period at S4, it finally sets the pushbutton switch to the RETURN key at S7 and returns to step S1.

Figure 6:
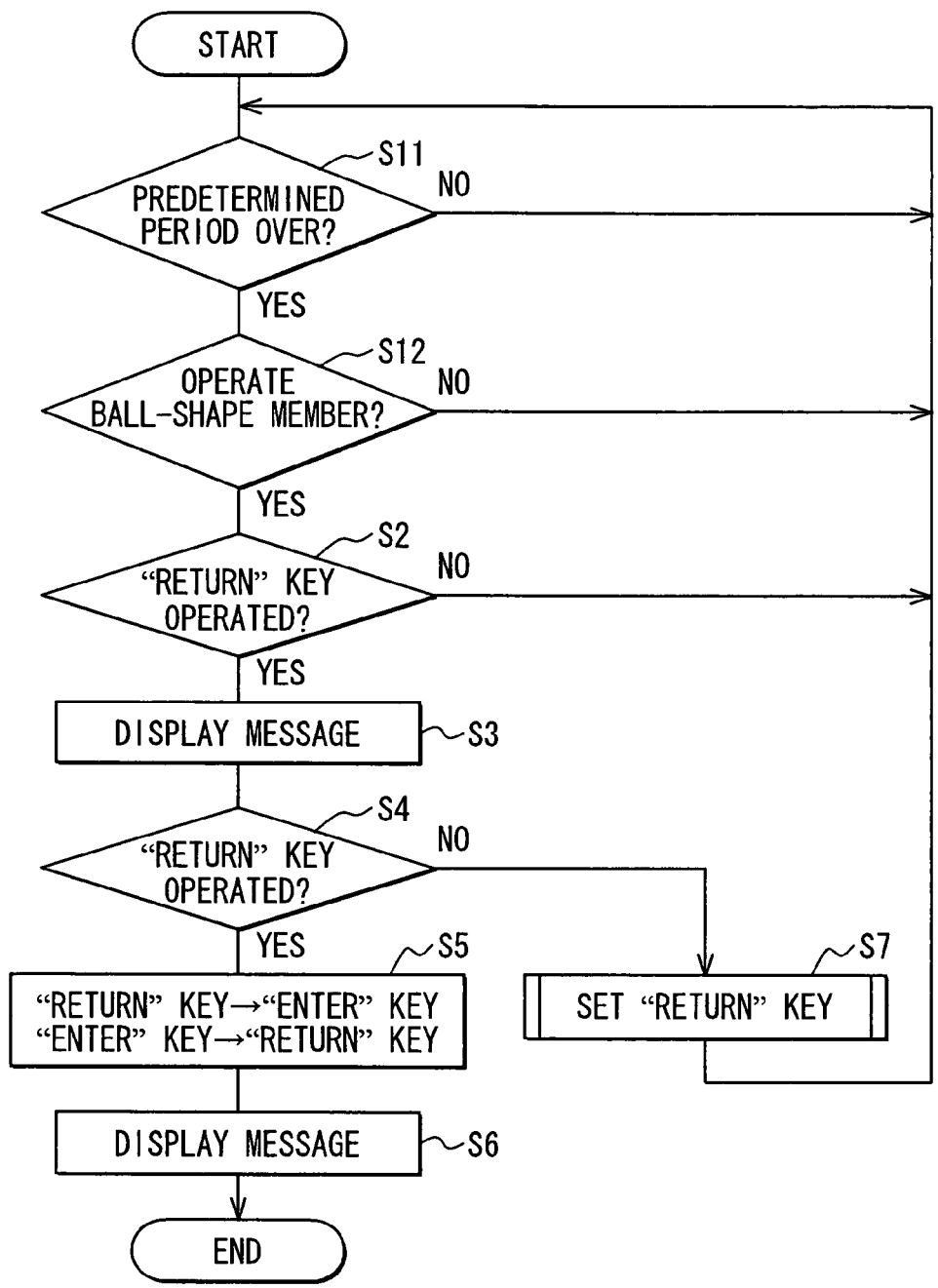
FIG. 6 is a flow diagram of operation of the manipulating system.

(2) If none of the first and fourth pushbutton switches 5a, 5d is operated for a predetermined period and either one of the pushbutton switches 5a, 5d is operated thereafter, the control unit 3 operates according to the flow diagram shown in FIG. 6. If none of the first and fourth pushbutton switches 5a, 5d is operated for a predetermined period, the control unit 3 provides YES at step S11 and goes to step S12, where the operation of the ball-shaped inputting member 6 is detected. If the result of the step S12 is YES, the control unit 3 executes the steps S2-S7. Therefore, the user can change over the function of the first and the fourth pushbutton switches 5a, 5d one to the other by operating the ball-shaped inputting member 6 and the pushbutton switch that has been set to the RETURN key in the predetermined period without operating the first pushbutton switch 5a or fourth pushbutton switch 5d for a predetermined period.

(3) If one of the first and fourth pushbutton switches 5a, 5d is double-clicked or pushed for a long time, the control unit 3 maintains the one of the pushbutton switch 5a or 5d as the ENTER key and the other pushbutton switch 5d or 5a as the RETURN key in case they have been so set.

On the other hand, the control unit 3 sets the double-clicked or long-time-pushed pushbutton switch to the ENTER key and the other pushbutton switch to the RETURN key in case they have not been so set.

That is, the user can change the pushbutton switch that has been used as the RETURN key to the ENTER key by double clicking or long-time pushing.

Figure 7A:
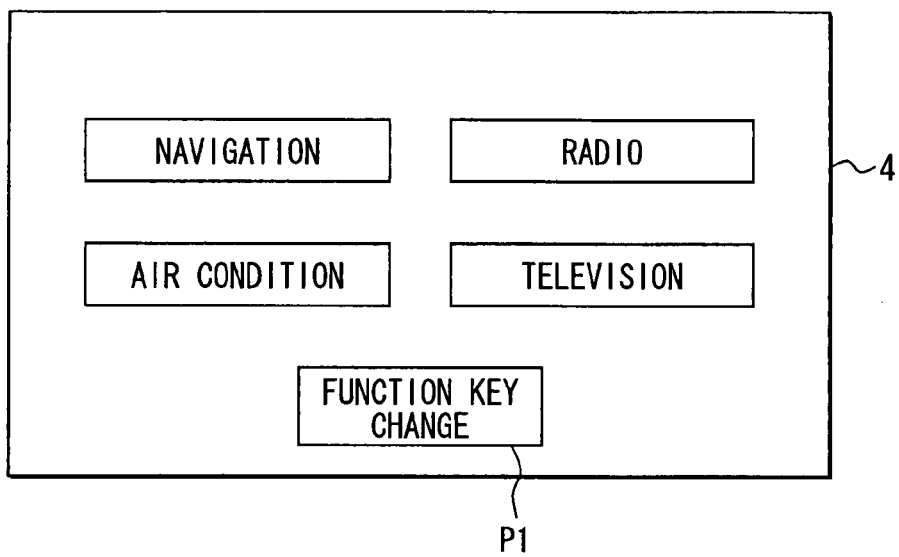
FIGS. 7A and 7B illustrate displays of guidance.

(4) If, as the first case, a displayed push button "FUNCTION KEY CHANGE" P1 that is displayed on the display panel of the display device 4 shown in FIG. 7A is operated by one of the first and fourth pushbutton switches 5a, 5d, the control unit 3 changes the pushbutton switch 5a or 5d used as the RETURN key to the ENTER key and the other push button key 5d or 5a used as the ENTER key to the RETURN key.

(5) If, as the second case, the push button P1 on the display panel of the display device 4 shown in FIG. 7A is operated by one of the first and fourth pushbutton switches 5a, 5d, the control unit 3 maintains the pushbutton switch to be used as the ENTER key and the other push button key to be used as the RETURN key in case they have been so set.

On the other hand, the control unit sets the operated pushbutton switch to the ENTER key and the other pushbutton switch to the RETURN key in case they have not been so set. That is, the user can change the function of the pushbutton switches 5a, 5d by operating the pushbutton switch 5a or 5d that has been used as the RETURN key.

Figure 7B:
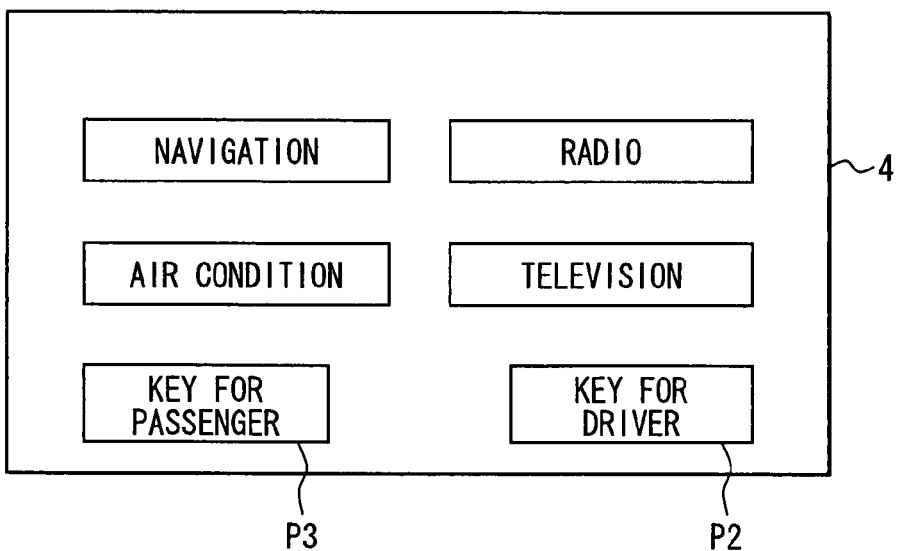

(6) If one of a driver-side pushbutton "KEY FOR DRIVER" P2 and a passenger-side pushbutton "KEY FOR PASSENGER" P3 on the display panel of the display device 4 shown in FIG. 7B is operated by one of the first and fourth pushbutton switches 5a, 5d, the control unit 3 maintains the first pushbutton switch 5a to be used as the ENTER key and the fourth pushbutton switch 5d to be used as the RETURN key in case they have been so set. On the other hand, the control unit 3 changes the first pushbutton switch 5a from the RETURN key to the ENTER key and the fourth pushbutton switch 5d from the ENTER key to the RETURN key in case they have not been so set.

When the passenger-side push button P3 is operated by either the first pushbutton switch 5a or the fourth pushbutton switch 5d in case of the fourth pushbutton switch 5d having been used as the ENTER key and the first pushbutton switch 5a having been used as the RETURN key, the control unit 3 maintains that status. On the other hand, the control unit 3 changes the fourth pushbutton switch 5d from the RETURN key to the ENTER key and the first pushbutton switch 5a from the ENTER key to the RETURN key in case of the fourth pushbutton switch 5d having been used as the RETURN key and the first pushbutton switch 5a having been used as the ENTER key.

(7) When a finger is inserted into the first hole 7a, the control unit 3 maintains the first pushbutton switch 5a to be used as the ENTER key and the fourth pushbutton switch 5d to be used as the RETURN key in case they have been so set. On the other hand, the control unit 3 changes the first pushbutton switch 5a from the RETURN key to the ENTER key and the fourth pushbutton switch 5d from the ENTER key to the RETURN key in case they have not been so set.

When a finger is inserted into the second hole 7b, the control unit 3 maintains the fourth pushbutton switch 5d to be used as the ENTER key and the first pushbutton switch 5a to be used as the RETURN key in case they have been so set. On the other hand, the control unit 3 changes the fourth pushbutton switch 5d from the RETURN key to the ENTER key and the first pushbutton switch 5a from the ENTER key to the RETURN key in case they have not been so set.

(8) When the driver operates one of the steering wheel 10, the shift knob 11 or one of window switches 12a-12d, the control unit 3 changes the first pushbutton switch 5a from the ENTER key to the RETURN key and the fourth pushbutton switch 5d from the RETURN key to the ENTER key in case they have not been so set. On the other hand, the control unit 3 maintains the first pushbutton switch 5a to be used as the RETURN key and the fourth pushbutton switch 5d to be used as the ENTER key in case they have been so set.

When the driver does not operate any of the steering wheel 10, the shift knob 11, one of window switches 12a-12d, the control unit 3 changes the fourth pushbutton switch 5d from the ENTER key to the RETURN key and the first pushbutton switch 5a from the RETURN key to the ENTER key in case they have not been so set. On the other hand, the control unit 3 maintains the fourth pushbutton switch 5d to be used as the RETURN key and the first pushbutton switch 5a to be used as the ENTER key in case they have been so set.

(9) When the engine has been started, the engine ECU 17 sends a signal to the control unit. The control unit 3 changes the first pushbutton switch 5a from the ENTER key to the RETURN key and the fourth pushbutton switch 5d from the RETURN key to the ENTER key in case they have not been so set. On the other hand, the control unit 3 maintains the first pushbutton switch 5a to be used as the RETURN key and the fourth pushbutton switch 5d to be used as the ENTER key in case they have been so set.

When the engine has not been started, the control unit 3 changes the fourth pushbutton switch 5d from the ENTER key to the RETURN key and the first pushbutton switch 5a from the RETURN key to the ENTER key in case they have not been so set. On the other hand, the control unit 3 maintains the fourth pushbutton switch 5d to be used as the RETURN key and the first pushbutton switch 5a to be used as the ENTER key in case they have been so set.

(10) When the driver touches the manipulating device 2, the control unit 3 changes the first pushbutton switch 5a from the ENTER key to the RETURN key and the fourth pushbutton switch 5d from the RETURN key to the ENTER key in case they have not been so set. On the other hand, the control unit 3 maintains the first pushbutton switch 5a to be used as the RETURN key and the fourth pushbutton switch 5d to be used as the ENTER key in case they have been so set.

When the passenger touches the manipulating device 2, the control unit 3 changes the fourth pushbutton switch 5d from the ENTER key to the RETURN key and the first pushbutton switch 5a from the RETURN key to the ENTER key in case they have not been so set. On the other hand, the control unit 3 maintains the fourth pushbutton switch 5d to be used as the RETURN key and the first pushbutton switch 5a to be used as the ENTER key in case they have been so set.

Figure 8A:
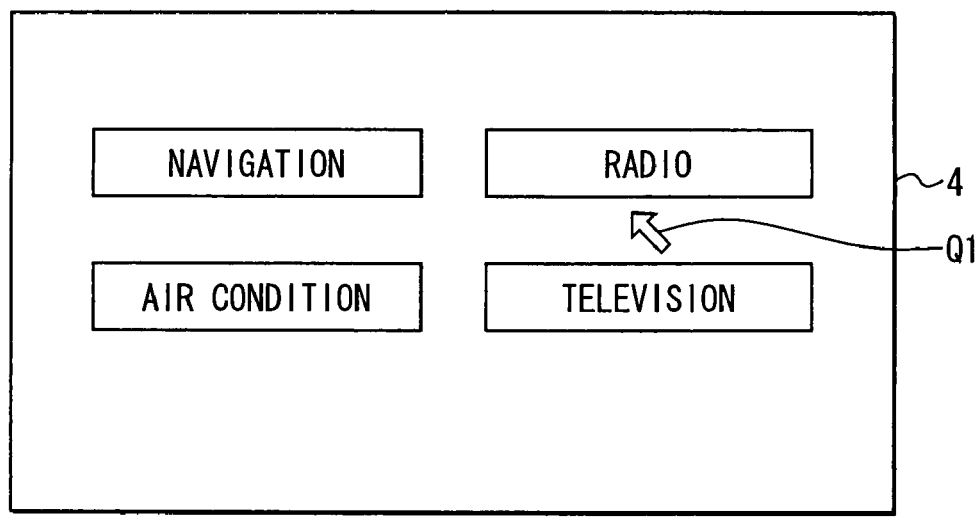
FIGS. 8A and 8B illustrate displays of guidance.
Figure 8B:
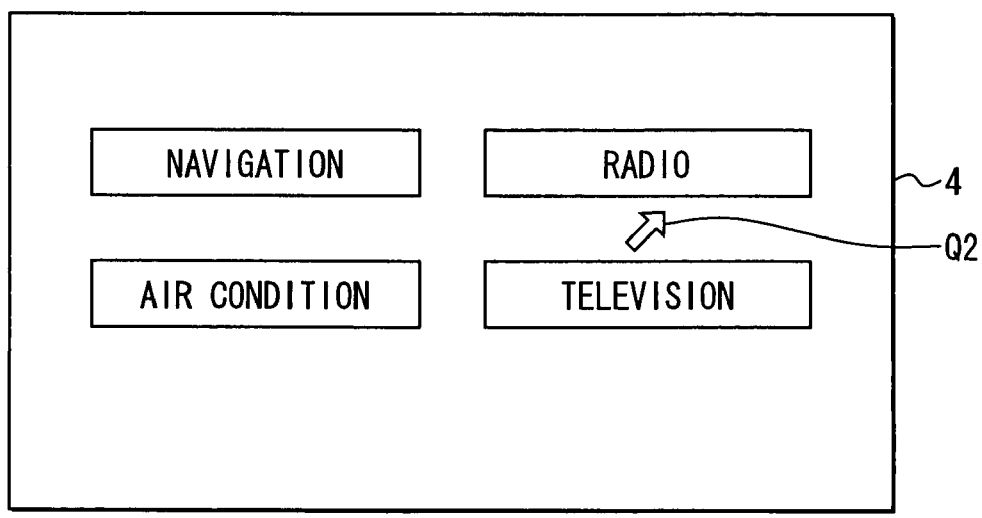
Figure 9A:
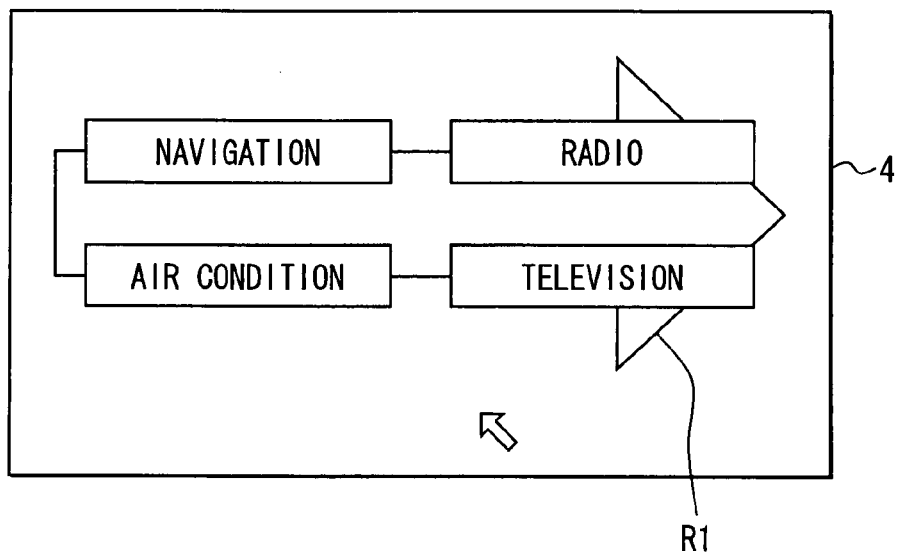
FIGS. 9A and 9B illustrate displays of guidance.
Figure 9B:
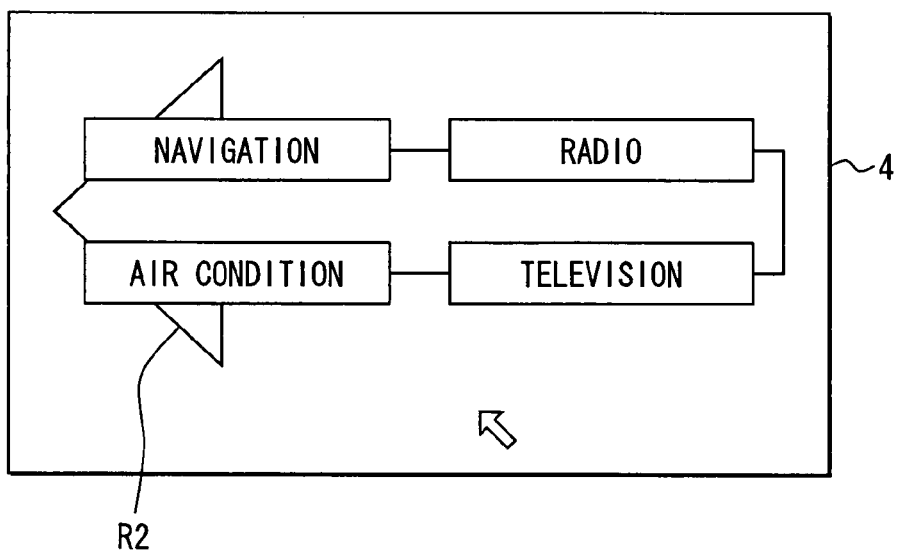
Figure 10A:
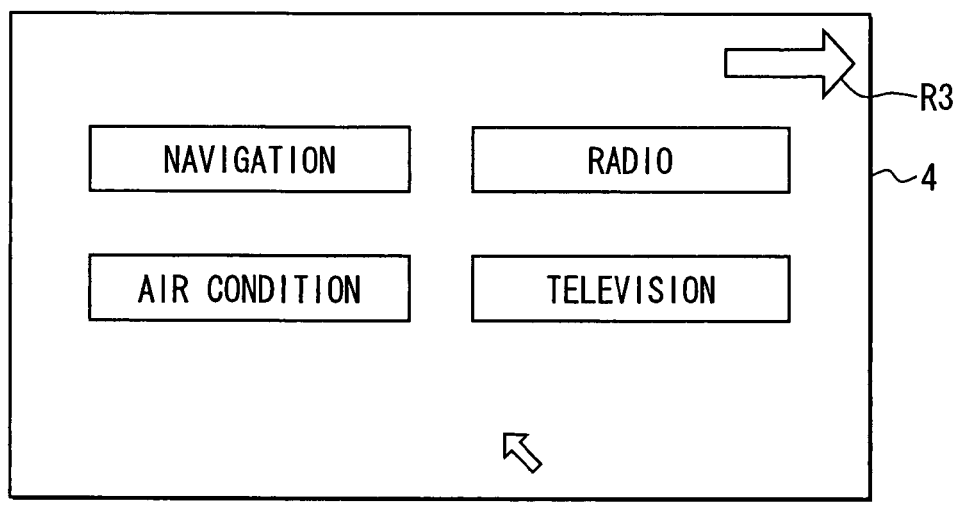
FIGS. 10A and 10B illustrate displays of guidance.
Figure 10B:
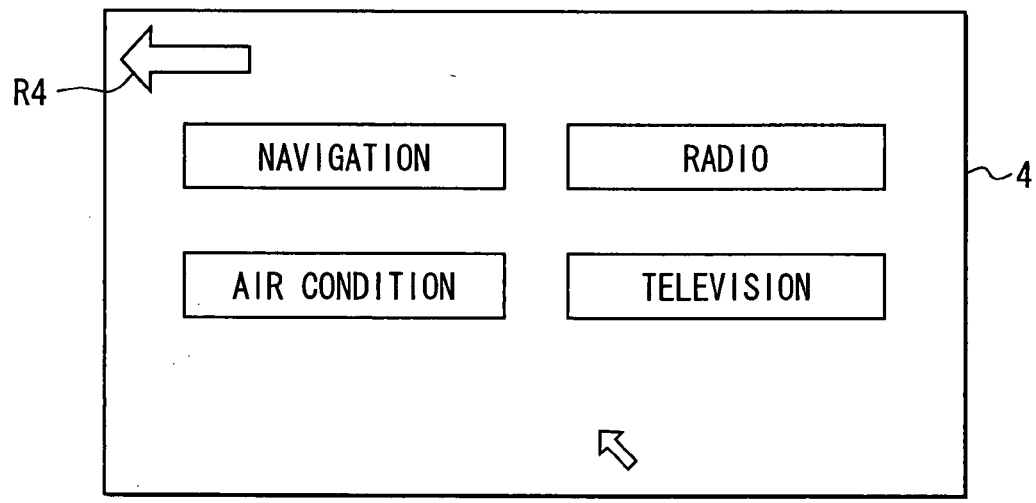

Incidentally, the control unit 3 sets the first pushbutton switch 5a located on the right side of the manipulating device 2 to the ENTER key and the fourth pushbutton switch 5d located on the left side thereof to the RETURN key for a driver's mode, while the control unit 3 sets the fourth pushbutton switch 5d to the ENTER key and the first pushbutton switch 5a to the RETURN key for a passenger's mode. The control unit 3 displays the mode on the display panel by a cursor Q1, Q2, as shown in FIGS. 8A and 8B, by an arrow R1, R2, R3, R4 as shown in FIGS. 9A, 9B, 10A and 10B. The control unit 3 may change the color of the display when the mode changes from one to the other.

When no signal from the first or fourth pushbutton switch 5a, 5d is sent to the control unit 3 for a preset period, the control unit 3 maintains the driver's mode or changes from the passenger's mode to the driver's mode.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An on-vehicle manipulating system comprising:
    a manipulating device having a housing, a first side pushbutton switch disposed at one side of the housing, a second side pushbutton switch disposed at the other side of the housing and an additional switch disposed at a prescribed portion of the housing; and
    a control unit for setting a first function to one of the first and second side pushbutton switches and a second function to the other of the first and second side pushbutton switches,
    wherein the control unit changes the function of the one of the first and second side pushbutton switches from the first function to the second function and the function of the other of the first and second side pushbutton switches from the second function to the first function, when the one of the first and second side pushbutton switches is operated subsequent to the other of the first and second side pushbutton switches that has been set to the second function being operated in a prescribed period after the additional switch is operated.

2. An on-vehicle manipulating system as in claim 1, wherein:
    the control unit provides a driver's mode in which the first side pushbutton switch is set to the first function and the second side pushbutton switch is set to the second function and a passenger's mode in which the second side pushbutton switch is set to the first function and the first side pushbutton switch is set to the second function; and the control unit changes the passenger's mode to the driver's mode when a predetermined time has passed after none of the first and second side pushbutton switches is operated.

3. An on-vehicle manipulating system as in claim 2 further comprising means for displaying a cursor by a display device,
wherein the means for displaying indicates one of the driver's mode and the passenger's mode that is provided by the control unit by the cursor.

4. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second side pushbutton switches and a second function to an other of the first and second side pushbutton switches,
wherein the control unit changes the function of the one of the first and second side pushbutton switches from the second function to the first function and the function of the other of the first and second side pushbutton switches from the first function to the second function when the one of the first and second side pushbutton switches is operated subsequent to the other of the first and second side pushbutton switches that has been set to the second function being operated after none of the first and second side pushbutton switches has been operated for a prescribed period.

5. An on-vehicle manipulating system comprising:
a manipulating device having a housing, a first side pushbutton switch disposed at one side of the housing and a second side pushbutton switch disposed at the other side of the housing; and
a control unit for setting a first function to one of the first and second side pushbutton switches and a second function to an other of the first and second side pushbutton switches,
wherein the control unit sets the first function to the one of the first and second side pushbutton switches if the one of the first and second side pushbutton switches is double-clicked or operated for a long time and sets the second function to the function of the other of the first and second side pushbutton switches, and
the control unit changes the function of the one of the first and second side pushbutton switches from the first function to the second function and the function of the other of the first and second side pushbutton switches from the second function to the first function when the other of the first and second side pushbutton switches is double-clicked or operated for the long time.

6. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
a display device for displaying a displayed pushbutton,
wherein the control unit sets the first function to the one of the first and second side pushbutton switches and sets the second function .to the other of the first and second side pushbutton switches according to an operation of the displayed pushbutton by the one of the first and second side pushbutton switches, and the control unit changes the function of the one of the first and second side pushbutton switches from the first function to the second function and the function of the other pushbutton switch from the second function to the first function, when the displayed pushbutton is operated by the other pushbutton switch.

7. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
a display device for displaying a display pushbutton,
wherein the control unit changes the function of one of the first and second side pushbutton switches from the second function to the first function and the function of the other pushbutton switch from the first function to the second function when the display pushbutton is operated by one of the pushbutton switches.

8. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
a display device for displaying a displayed pushbutton,
wherein:
the control unit sets the first function to one of the first and second side pushbutton switches and sets the second function to the other of the first and second side pushbutton switches according to an operation of the displayed pushbutton by the one of the first and second side pushbutton switches,
the displayed device displays a first displayed pushbutton to be operated by the first side pushbutton switch and a second displayed push button to be operated by the second side pushbutton switch;
the control unit sets the first function to the first side pushbutton switch and the second function to the second side pushbutton switch when the first displayed pushbutton is operated by one of the first side and second side pushbutton switches; and
the control unit sets the first function to the second side pushbutton switch and the second function to the first side pushbutton switch when the second displayed pushbutton is operated by one of the first side and second side pushbutton switches.

9. An on-vehicle manipulating system comprising:
a manipulating device having a housing, a first side pushbutton switch, a finger-insert-able first hole, which are disposed at one side of the housing, a second side pushbutton switch and a finger-insert-able second hole, which are disposed at the other side of the housing; and
a control unit for setting a first function to one of the first and second pushbutton switches and a second function to the other pushbutton switch,
wherein the control unit sets the first function to the first side pushbutton switch and the second function to the second side pushbutton switch when a finger is inserted into the finger-insert-able first hole and sets the first function to the second side pushbutton switch and the second function to the first side pushbutton switch when a finger is inserted into the finger-insert-able second hole.

10. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
means for sensing an operation of a vehicle accessory,
wherein the control unit determines whether to change or maintain the set status of the first and second functions of the first and second pushbutton switches according to an output signal of the sensing means and the set status of the first and second functions of the first and second pushbutton switches.

11. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
means for sensing engine operation of the vehicle,
wherein the control unit determines whether to change or maintain the set status of the first and second functions of the first and second pushbutton switches according to an output signal of the sensing means and the set status of the first and second functions of the first and second pushbutton switches.

12. An on-vehicle manipulating system comprising:
a manipulating device having a housing, a first side pushbutton switch disposed at one side of the housing and a second side pushbutton switch disposed at the other side of the housing;
a control unit for setting a first function to one of the first and second pushbutton switches and a second function to the other pushbutton switch; and
means for sensing touch by a user with the manipulating device,
wherein the control unit determines whether to change or maintain the set status of the first and second functions of the first and second pushbutton switches according to an output signal of the sensing means and the set status of the first and second functions of the first and second pushbutton switches.

* * * * *